(12) United States Patent
Zhai et al.

(10) Patent No.: US 12,271,791 B2
(45) Date of Patent: Apr. 8, 2025

(54) ATTENTION FREE TRANSFORMER

(71) Applicant: Apple Inc., Cupertino, CA (US)

(72) Inventors: Shuangfei Zhai, Sunnyvale, CA (US);
Walter A. Talbott, Cupertino, CA (US);
Nitish Srivastava, San Francisco, CA (US);
Chen Huang, Cupertino, CA (US);
Hanlin Goh, Santa Clara, CA (US);
Joshua M. Susskind, Campbell, CA (US)

(73) Assignee: Apple Inc., Cupertino, CA (US)

( * ) Notice: Subject to any disclaimer, the term of this patent is extended or adjusted under 35 U.S.C. 154(b) by 1010 days.

(21) Appl. No.: 17/308,033

(22) Filed: May 4, 2021

(65) Prior Publication Data
US 2022/0108212 A1 Apr. 7, 2022

Related U.S. Application Data

(60) Provisional application No. 63/145,429, filed on Feb. 3, 2021, provisional application No. 63/086,517, filed on Oct. 1, 2020.

(51) Int. Cl.
| | |
|---|---|
| G06N 20/00 | (2019.01) |
| G06F 17/16 | (2006.01) |
| G06F 40/58 | (2020.01) |
| G06N 5/04 | (2023.01) |
| G06T 3/4053 | (2024.01) |

(52) U.S. Cl.
CPC ............ *G06N 20/00* (2019.01); *G06F 17/16* (2013.01); *G06F 40/58* (2020.01); *G06N 5/04* (2013.01); *G06T 3/4053* (2013.01)

(58) Field of Classification Search
None
See application file for complete search history.

(56) References Cited

U.S. PATENT DOCUMENTS

2021/0232773 A1* 7/2021 Wang .................. G06F 18/21

OTHER PUBLICATIONS

Tay et al. (Tay) "Compositional de-attention networks", Advances in Neural Information Processing Systems 32 (NeurIPS 2019), ISBN: 9781713807933, 2019 "https://proceedings.neurips.cc/paper/2019/file/16fc18d787294ad5171100e33d05d4e2-Paper.pdf", Compositional De-Attention Networks (neurips.cc) (Year: 2019).*
Shi et al. "Weak-Attention Suppression for Transformer Based Speech Recognition", Facebook AI, USA, https://arxiv.org/abs/2005.09137 in Audio and Speech Processing (eess.AS); Computation and Language (cs.CL), interspeech 2020, May 18, 2020 (Year: 2020).*
Pan et al. "X-Linear Attention Networks for Image Captioning" DOI: https://doi.org/10.48550/arXiv.2003.14080, Mar. 31, 2020, http://arxiv.org/pdf/2003.14080.pdf (Year: 2020).*
Ba, et al., "Layer normalization," 2016, retrieved from arXiv.org/pdf/1607.06450.

(Continued)

*Primary Examiner* — Xuyang Xia
(74) *Attorney, Agent, or Firm* — BAKERHOSTETLER

(57) ABSTRACT

Attention-free transformers are disclosed. Various implementations of attention-free transformers include a gating and pooling operation that allows the attention-free transformers to provide comparable or better results to those of a standard attention-based transformer, with improved efficiency and reduced computational complexity with respect to space and time.

23 Claims, 6 Drawing Sheets

(56) References Cited

OTHER PUBLICATIONS

Bradbury, et al., "Quasi-recurrent neural networks," 2016, retrieved from arXiv.org/pdf/1611.01576.
Chang, et al., ShapeNet: An Information-Rich 3D Model Repository, 2015 Technical Report, retrieved from arXiv.org/pdf/1512.0301.
Chen, et al., "Generative pretraining from Pixels," 2020, retrieved from https://cdn.openai.com/papers/Generative_Pretraining_from_Pixels_V2.pdf.
Choromanski, et al., "Rethinking attention with performers," 2020, retrieved from https://openreview.net/pdf?id=Ua6zuk0WRH.
Chung, et al., Empirical evaluation of gated recurrent neural networks on sequence modeling, 2014, retrieved from arXiv.org/pdf/1412.3555.
Dahl, et al., "Pixel recursive super resolution," 2017, retrieved from https://arxiv.org/pdf/1702.00783.pdf.
Dai, et al., "Transformer-xl: Attentive language models beyond a fixed-length context," 2019, retrieved from arXiv.org/pdf/1901.02860.
Devlin, et al., Pre-training of deep bidirectional transformers for language understanding, 2018, retrieved from https://arxiv.org/pdf/1810.04805.pdf.
Hochreiter, et al., "Long short-term memory," Neural computation, 1997, 9(8): 1735-7180.
Huang, et al., "CCNET: Criss-cross attention for semantic segmentation," 2019 IEEE/CVF International Conference on Computer Vision (ICCV), pp. 603-612.
Huang, et al., Interlaced sparse self-attention for semantic segmentation, 2019, retrieved from ArXiv.org/pdf/1907.12273.
Katharopoulos, et al., "Transformers are rnns: Fast autoregressive transformers with linear attention," 2020 Proceedings of the International Conference on Machine Learning (ICML), retrieved from https://fleuret.org/papers/katharopoulos-et-al-icml2020.pdf.
Kitaev, et al., "Reformer: The efficient transformer," 2020, retrieved from arXiv.org/pdf/abs/2001.04451.
Klein, et al., "OpenNMT: Opensource toolkit for neural machine translation," Proceedings of ACL 2017, System Demonstrations, pp. 67-72, retrieved from https://www.aclweb.org/anthology/P17-4012.
Lee, et al., "Set transformer: A framework for attention-based permutation-invariant neural networks," 2019, International Conference on Machine Learning, pp. 3744-3753.
Liu, et al., "Deep learning face attributes in the wild," 2015, Proceedings of International Conference on Computer Vision (ICCV).
Mahoney, "Large text compression benchmark," 2011, retrieved from http://www.mattmahoney.net/dc/text.html, 95 pages.
Nash, et al., "Polygen: An autoregressive generative model of 3d meshes," ICML 2020.
Parmar, et al., "Image transformer," 2018, retrieved from arXiv.org/pdf/1802.05751.
Radford, et al., "Improving language understanding by generative pre-training," 2018, retrieved from https://s3-us-west-2.amazonaws.com/openai-assets/research-covers/language-unsupervised/language_understanding_paper.pdf.
Rae, et al., "Compressive transformers for long-range sequence modelling," 2020, retrieved from arXiv.org/pdf/1911.05507.
Ramachandran, et al., "Stand-alone self-attention in vision models," 2019, retrieved from ArXiv.org/pdf/1906.05909.
Rewon, et al., "Generating long sequences with sparse Transformers," 2019, retrieved from http://arxiv.org/abs/1904.10509.
Roy, et al., "Efficient content-based sparse attention with routing transformers," 2020, retrieved from arXiv.org/pdf/2003.05997.
Salimans, et al., "Pixelcnn++: Improving the pixelcnn with discretized logistic mixture likelihood and other modifications," 2017, retrieved from arXiv.org/pdf/1701.05517.
Sukhbaatar, et al., "Adaptive attention span in transformers," 2019 Proceedings of the 57th Annual Meeting of the Association for Computational Linguistics.
Tay et al., "Efficient transformers: A survey," 2020, retrieved from https://arxiv.org/pdf/2009.06732.pdf.
Tay et al., "Sparse sinkhorn attention," 2020, retrieved from https://arxiv.org/pdf/2002.11296.pdf.
Tay, et al., "Synthesizer: Rethinking self-attention in transformer models," 2020, retrieved from https://arxiv.org/pdf/2005.00743.pdf.
Vaswani, et al., "Attention is all you need," 2017 Advances in neural information processing systems, pp. 5998-6008, 2017.
Wang, et al., "Axial-deeplab: Standalone axial-attention for panoptic segmentation," 2020, retrieved from arxiv.org/pdf/2003.07853.
Wang, et al., "Linformer: Self-attention with linear complexity," 2020, retrieved from ArXiv.org/pdf/2006.04768.
Wu, et al., "Pay less attention with lightweight and dynamic convolutions," 2019, retrieved from ArXiv.org/pdf/1901.10430.
Zhu, et al., "Asymmetric non-local neural networks for semantic segmentation," 2019 IEEE/CVF International Conference on Computer Vision (ICCV), pp. 593-602.

* cited by examiner $$Q'_t \odot \frac{\sum \left[ \text{EXP}\left( \left( K'_{\leq t} \right) \right) \odot V'_{\leq t} \right]}{\sum \text{EXP}\left( \left( K'_{\leq t} \right) \right)} = \underbrace{\phantom{XXXX}}_{\text{POOL}} =$$

FIG. 4

$$Q'_t \odot \sum \left[ \sigma\left( \left( K'_{\leq t} \right) \right) \odot V'_{\leq t} \right] = \underbrace{\phantom{XXXX}}_{\text{POOL}} =$$

FIG. 5

ATTENTION FREE TRANSFORMER

CROSS REFERENCE TO RELATED APPLICATIONS

This application claims the benefit of U.S. Provisional Patent Application No. 63/086,517, entitled "Attention Free Transformer," filed on Oct. 1, 2020, and claims the benefit of U.S. Provisional Patent Application No. 63/145,429, entitled "Attention Free Transformer," filed on Feb. 3, 2021, the disclosure of each of which is hereby incorporated by reference herein in its entirety.

TECHNICAL FIELD

The present description generally relates to machine learning.

BACKGROUND

Software engineers and scientists have been using computer hardware for machine learning to make improvements across different industry applications including language processing.

BRIEF DESCRIPTION OF THE DRAWINGS

Certain features of the subject technology are set forth in the appended claims. However, for purpose of explanation, several embodiments of the subject technology are set forth in the following figures.

FIG. 4 illustrates an example of a causal attention-free operation in accordance with one or more implementations.

FIG. 5 illustrates an example of a local causal attention-free operation in accordance with one or more implementations.

DETAILED DESCRIPTION

Figure 1:
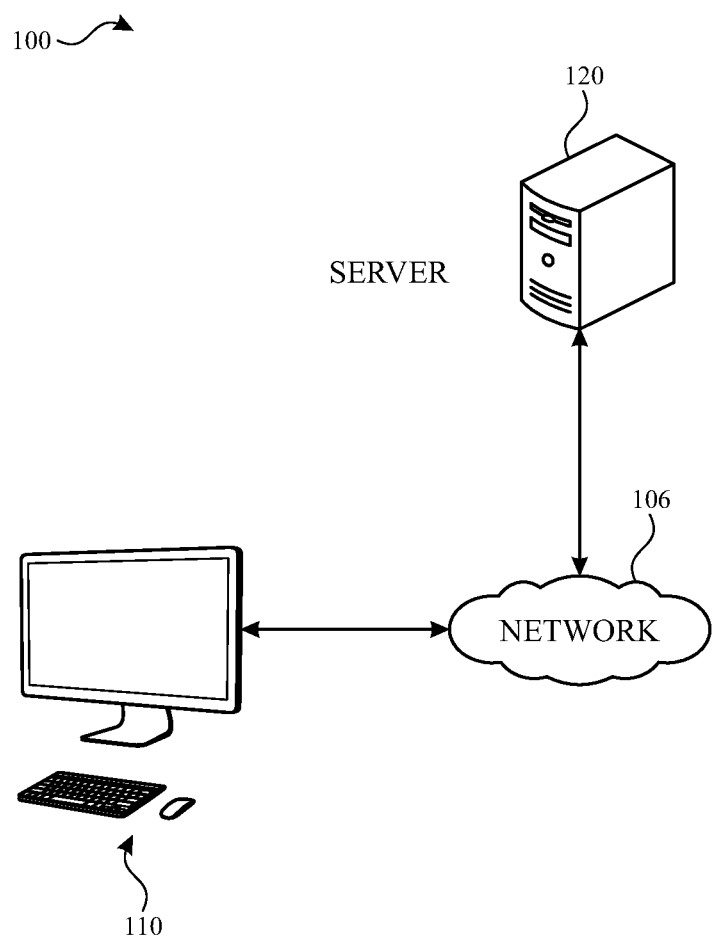
FIG. 1 illustrates an example network environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has seen a significant rise in popularity in recent years due to the availability of massive amounts of training data, and advances in more powerful and efficient computing hardware. Transformers are machine learning models that have been developed for, for example, natural language processing. Transformers commonly implement an encoder/decoder architecture that computes an attention at each layer of the encoder and the decoder. Computing the attention includes computing a pair-wise product that indicates a relevance of each element of an input context to each other element. Performing an attention operation includes, to compute each attention, a pair-wise product of queries and keys that requires a number of compute operations that scales in complexity as $T^2$, where T denotes the length of a context.

Attention mechanisms have allowed transformers to drive the advancement of various machine learning problems, including language modeling, image modeling, and set modeling. Different from other model architectures such as Convolutional Neural Nets (CNNs) or Recurrent Neural Nets (RNNs), transformers implementing attention mechanisms enable direct interaction between every element within a sequence, which makes the transformers especially powerful at capturing long term dependency. The basic computations of transformers during training time are also parallel, which enables effective usage of powerful parallel computing hardware such as GPUs and TPUs.

However, the power of transformers implementing attention comes with a high computational cost. The root cause of this high cost is that attention operations have quadratic (e.g., $T^2$) time and space complexity with respect to the context size (e.g., T). This quadratic time and space complexity makes it especially difficult to scale transformers to inputs with large context sizes.

The subject technology provides various transformers that are free of attention computations, and which can be referred to generally herein as attention-free transformers (AFTs).

The subject technology provides transformers that incorporate a novel gating and pooling operation. In one or more implementations, the transformers disclosed herein can mimic the extreme case of a multi-head attention transformer, with a number of heads equal to the number of input elements. The gating and pooling operation can be performed without computing or approximating any attention (e.g., without computing or approximating a dot product attention). In one or more implementations, transformers are provided that include a gating and pooling operation, based on element-wise operation, that is more efficient than an attention operation, and provides comparable and/or better results than attention-based transformers for several benchmarks. As described in further detail hereinafter, these benchmarks include, unconditional image modeling, image autoregressive modeling, language modeling, machine translation, and image super resolution (as examples). The present disclosure shows that the disclosed efficient transformer provides efficiency in both time and space, while providing competitive results to conventional attention-based transformers on each benchmark.

As described in further detail herein, in various implementations, the transformers disclosed herein may include an AFT-relu2 transformer, an AFT-relu transformer, and/or an AFT-softmax transformer, each of which may include one or more gating and pooling operations. In one or more implementations, a transformer may be implemented as a causal attention-free transformer. In one or more implementations, a transformer may be implemented as a local causal attention-free transformer. In various implementations, a causal attention-free transformer and/or a local causal attention free transformer may be implemented for one-dimensional inputs (e.g., a AFT-softmax-local1d transformer as described herein), two dimensional inputs (e.g., a AFT-softmax-local2d transformer as described herein), or three dimensional inputs. In one or more implementations, a causal attention-free transformer and/or a local causal attention-free transformer may be implemented as an in place operation (e.g., including for training of the transformer).

Implementations of the subject technology improve the computing functionality of a given electronic device by providing a transformer that reduces the $O(T^2)$ operations of an attention-based transformer to an, e.g., $O(T)$ gating and pooling operation with respect both space and time, where T is the context size. In one or more implementations, the attention-free transformers disclosed herein can be trained with a linear time and space complexity with respect to both the sequence length and feature dimension. In one or more implementations, the attention-free transformers disclosed herein can be computed with a constant memory and time complexity per step.

Various methods for addressing scalability issues of attention-based transformers, such as sparsity, locality sensitive hashing, low rank decomposition, kernel approximation and etc., can be used to approximate the full attention operation. In contrast, the attention-free transformers disclosed herein can be computed without using or approximating the dot product attention operation, in one or more implementations. For example, in accordance with one or more implementations, a key and a value may first be multiplied element-wise, the result of which can then be pooled over the context dimension (e.g., in a causal model, this corresponds to a cumulative sum). The query may then be multiplied with the reduced key-value representation element-wise to produce the final output. In this way, the attention-free transformer disclosed herein can maintain the full advantage of dot product attention, namely direct interaction between any two elements in a sequence (e.g., up to proper masking), without using the resources to compute the full dot product attention. For example, the computational cost of an attention-free transform may be reduced to a $O(Td)$ complexity for time and space, where T and d are the context length and feature dimension, respectively. In an autoregressive decoding mode, attention-free transformers (AFTs) also provide constant decoding time and space complexity per step, compared to $O(T)$ for attention-based transformers. For example, AFTs may provide $O(d)$ time and space complexity in autoregressive decoding.

As shown in further detail hereinafter, in some implementations, aspects of AFTs can mimic an extreme case of multi-head dot product attention (MHA). In particular, by 1) setting the number of heads equal to the feature dimension in MHA, and 2) using relu in place of softmax as the non-linearity, MHA can be decomposed into a summation of two AFT modules (see Equation 3 below). However, this relationship to MHA is not true for all AFTs. For example, by varying the non-linearity injected after the query and key, AFTs can be generated that do not have a MHA counterpart. This flexibility of AFTs (e.g., to vary the non-linearity) in comparison with MHA models, allows AFTs to provide improved performance. These features of AFTs are in direct contrast with previous and concurrent "linearized attention" models, which are constrained by the design space of MHA in which the nonlinearity on the query and key are shared.

FIG. 1 illustrates an example network environment 100 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, and a server 120. The network 106 may communicatively (directly or indirectly) couple the electronic device 110 and/or the server 120. In one or more implementations, the network 106 may be an interconnected network of devices that may include, or may be communicatively coupled to, the Internet. For explanatory purposes, the network environment 100 is illustrated in FIG. 1 as including the electronic device 110, and the server 120; however, the network environment 100 may include any number of electronic devices and any number of servers.

The electronic device 110 may be, for example, a desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 110 is depicted as a desktop computer (e.g., a computer that is integrated into a display housing). The electronic device 110 may be, and/or may include all or part of, the electronic system discussed below with respect to FIG. 8.

In one or more implementations, the electronic device 110 may provide a system for training a transformer using training data, where the trained transformer is subsequently deployed locally at the electronic device 110. Further, the electronic device 110 may provide one or more machine learning frameworks for training transformers and/or developing applications using transformers. In an example, such machine learning frameworks can provide various machine learning algorithms and models for different problem domains in machine learning. In an example, the electronic device 110 may include a deployed transformer that provides an output of data corresponding to a prediction or transformation or some other type of machine learning output, responsive to an input to the transformer.

In an implementation, the server 120 may train a given transformer for deployment to a client electronic device (e.g., the electronic device 110). In other implementations, the server 120 may provide a system for training transformer using training data, where the trained transformer is subsequently deployed locally at the server 120. The transformer may be deployed on the server 120 and/or the electronic device 110 can then perform one or more machine learning algorithms such as gating and pooling operations. In an implementation, the server 120 provides a cloud service that utilizes the trained transformer and continually learns over time.

Figure 2:
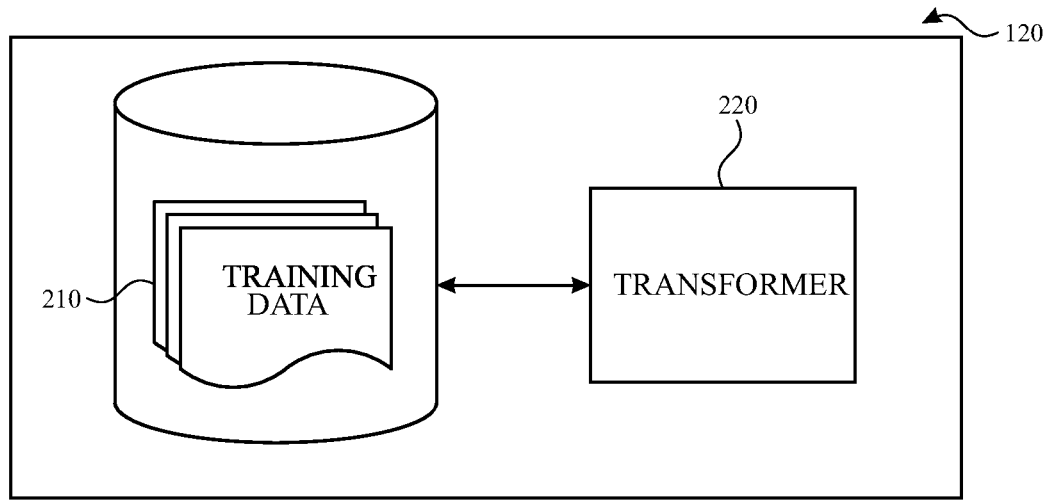
FIG. 2 illustrates an example computing architecture for a system providing attention-free transformers in accordance with one or more implementations.

FIG. 2 illustrates an example computing architecture for a system implementing efficient transformers, such as attention-free transformers, in accordance with one or more implementations. For explanatory purposes, the computing architecture is described as being provided by the server 120, such as by a processor and/or memory of the server 120; however, the computing architecture may be implemented by any other electronic devices, such as the electronic device 110. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the server 120 includes training data 210 for training a machine learning model such as a transformer. In an example, the server 120 may utilize one or more machine learning algorithms that uses training data 210 for training a transformer 220.

Training data 210 may include one-dimensional strings of words, two-dimensional images, and/or one or more other one, two, or three-dimensional training inputs and/or desired (e.g., training) outputs corresponding to the training inputs. As examples, the training data may include input training data such as images from the CIFAR-10 dataset and/or the CelebA dataset, sentences or other strings of characters or words, and/or other one, two, or three-dimensional training inputs. The training data may also include, as examples, output training data such as translations of sentences, other modifications of sentences, modified resolution images, point clouds, etc. as described in further detail hereinafter.

In one or more implementations, transformer 220 may include a transformer that implements a gating and pooling operation. For example, transformer 220 may be implemented as an AFT-relu2 transformer, an AFT-relu transformer, or an AFT-softmax transformer in various implementations. In one or more implementations, the gating and pooling operations may include (1) applying a non-linearity to a key, (2) combining the key with a value using an element-wise multiplication, (3) reducing the spatial context with global pooling, (4), applying a rectified linear unit (relu) operation to the query, and (5) combining each point of the query with the reduced context.

Figure 3:
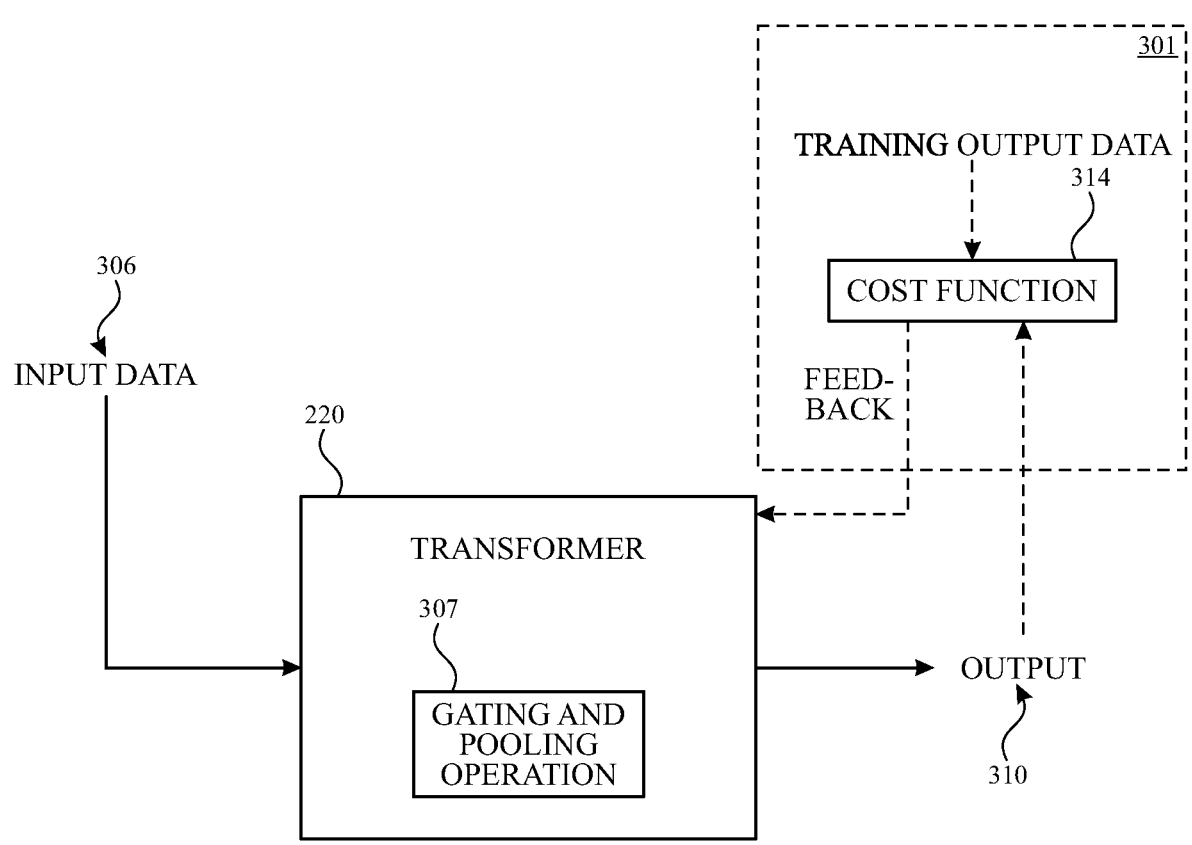
FIG. 3 illustrates a schematic flow diagram for operation of a transformer in accordance with implementations of the subject technology.

FIG. 3 illustrates a schematic flow diagram for operation of an attention-free transformer (AFT). As shown in FIG. 3, input data 306 may be provided to a transformer 220 that includes one or more gating and pooling operations, such as gating and pooling operation 307. Input data 306 may be one-dimensional input data such as a string of text, two-dimensional input data such as an image or an array of values, three-dimensional input data such as a three-dimensional model or point cloud, or other input data arranged in one, two, three, or more than three dimensions. In one or more implementations, input data 306 may be preprocessed prior to providing the input data to the transformer 220. For example, preprocessing of input data 306 may include embedding and/or positional encoding of the input data. In other implementations, the embedding and/or positional encoding may be performed and/or learned by the transformer (e.g., by a first encoder or decoder of the network).

Responsive to receiving the input data 306, transformer 220 may generate, at least in part by executing one or more gating and pooling operations such as gating and pooling operation 307, an output 310. Output 310 may be one-dimensional output data such as a string of text (e.g., a prediction or a related string for an input string such as next string of characters, or a transformation of an input string such as a translation of the string to a different language), two-dimensional output data such as an image or an array of values (e.g., an image having a higher resolution than a corresponding input image, or a super-resolution image), three-dimensional output data (e.g., a depth map based on two or three-dimensional input data such as an image or a lower resolution depth map), and/or or other output data arranged in one, two, three, or more than three dimensions. The output 310 may have a number of dimensions that corresponds to the number of dimensions of the input data 306. Output 310 may, in one or more implementations, be a probability distribution that maps to an output string, image, or other desired output of the transformer 220.

In contrast with conventional transformers that require computations of an attention operation, the gating and pooling operation 307 allows the transformer 220 to generate the output 310 without performing an attention operation. The gating and pooling operation 307 may be performed as part of any or all of one or more encoders and/or one or more decoders of the transformer 220.

In attention-based transformers, multi-head attention (MHA) operations are typically performed. Specifically, given three sequences, namely a query $Q \in R^{T \times d}$, a key $K \in R^{T \times d}$, a value $V \in R^{T \times d}$, and number of heads h, an MHA operation computes a scaled dot product attention for each head, defined as:

$$f_i(Q, K, V) = \sigma\left(\frac{Q_i'(K_i')^T}{\sqrt{d_k}}\right)V_i', \tag{1}$$

$$s.t.\ Q_i' = QW_i^Q,\ K_i' = KW_i^K,\ V_i' = VW_i^V,$$

where $W_i^Q \in R^{d \times d_k}$, $W_i^K \in R^{d \times d_k}$, $W_i^V \in R^{d \times d_v}$ are three linear transformations, and σ is a non-linearity that is set as the softmax$_r$ function (with the subscript r indicating that softmax function is applied to each row of a matrix). In Equation (1) above, $d_q$, $d_k$, and $d_v$ are the dimensions for the query, key, and value, respectively. The MHA operation of a conventional attention-based transformer then concatenates the output of h attention heads along the channel dimension, resulting in a feature dimension of $h \times d_v$, where $d_k = d_v$ and $h = d/d_k$, which means that the query, key, and values are of the same dimension within each head, and the output's dimension matches that of the input.

In practice, given a fixed dimensionality of the output, an attention-based transformer benefits from setting the number of heads to be greater than one. The benefit of using number of heads greater than one is that each head can perform a different aggregation of the context (i.e., the value), thus achieving more flexibility compared to using a single head. In the limit of the maximum number of heads, which amounts to letting $d_k = 1$ for each head, the dot product operation within each head reduces to scalar product. However, this limit immediately presents a practical challenge for implementing attention-based transformers, as the space complexity increases to $O(T \times T \times d)$, where d is potentially a large quantity.

Aspects of the subject technology provide an attention-free transformer (e.g., transformer 220) that mimics the extreme case of multi-head attention, using a more efficient operation than the MHA operation. For example, by replacing the softmax nonlinearity with a rectified linear unit (relu)

function, the key and value can be first aggregated along the context dimension, the result of which then interacts with the query.

For example, in contrast with Equation (1) above, by setting σ to be relu function, instead of softmax, the extreme limit of multi-head attention can be mimicked with a surprisingly simple form as shown in Equation (2):

$$f_i(Q, K, V) = [Q'_i(K'_i)^T]_+ V'_i \qquad (2)$$
$$= [Q'_i]_+ \odot ([K'_i]_+^T V'_i) + [-Q'_i]_+ \odot ([-K'_i]_+^T V'_i),$$

where $\odot$ is an element-wise product, with support for broadcasting when the operands' dimensions don't exactly match, and $[\bullet]+$ denotes a relu operator. In Equation (2), $Q'_i, \overline{k}'_i, V'_i \in R^{T \times 1}$, by definition. Equation (2) is remarkable, as the $O(T^2)$ operation of the attention-based transformer is replaced with an $O(T)$ (e.g., with respect to both space and time complexity) operation, by re-arranging the order of computation.

In particular, the efficient operations shown in Equation (2) first combine the key, K, and the query, Q, by reducing the spatial dimension; the interaction between the query, Q, and the key, K, in Equation (2) simplify to an element-wise operation, which is extremely efficient (e.g., in comparison with an attention-based computation as represented by Equation (1)). The efficient operation shown in Equation (2) essentially eliminates the computation of an attention, and may be used to form an example of an attention-free transformer (AFT). A transformer 220 implemented using Equation (2) above (e.g., in one or more encoders and/or decoders of the transformer) may be referred to herein as an AFT-relu2 transformer, as the form of Equation (2) is attention free and involves applying two relu functions $[\bullet]+$.

By setting $d_v = d_k$, the output of the concatenated AFT-relu2 heads of Equation (2) can also be concisely written as in Equation (3):

$$f(Q, K, V) = \qquad (3)$$
$$[Q']_+ \odot \sum_{t=1}^{T}([K']_+ \odot V')_t + [-Q']_+ \odot \sum_{t=1}^{T}([-K']_+ \odot V')_t$$
$$\text{s.t. } Q' = QW^Q, K' = KW^K, V' = VW^V,$$

where $W_Q$, $W^K$, and $W^V \in R^{d \times d}$ are the combined linear transformation matrices for the query, key, and value, respectively, and $A_t$ denotes the tth row of a matrix A.

In one or more implementations, transformer 220 may be implemented as an AFT-relu2 transformer, in which the gating and pooling operation 307 is implemented using Equation (3) above. As can be seen from Equation (3), for a transformer 220 implemented as an AFT-relu2 transformer, performing the gating and pooling operation may include performing a first gating operation (e.g., $[k']_+ \odot V'$ and/or $[-K']_+ \odot V'$), performing a pooling operation $$\left(\text{e.g., } \sum_{t=1}^{T}\right)$$

using a result of the first gating operation, and performing a second gating operation $$\left(\text{e.g., } [Q']_i \odot \sum_{t=1}^{T} \text{ and/or } [-Q']_- \odot \sum_{t=1}^{T}\right)$$

using a result of the pooling operation. In this example, the first gating operation includes an element-wise product $\odot$ using a key matrix, K, and a value matrix, V, the first gating operation further includes computing a relu function $[\bullet]_+$ using the key matrix K prior to performing the element-wise product $\odot$, and the pooling operation $$\left(\text{e.g., } \sum_{t=1}^{T}\right)$$

includes computing a sum over rows of the result of the element-wise product $\odot$ using the key matrix, K, and the value matrix, V. In this example, the second gating operation includes computing an additional element-wise product $\odot$ using a query, Q, and the result of the pooling operation.

However, it is appreciated that the gating and pooling operations represented in Equation (3) are but one example of the gating and pooling operations described herein, and transformer 220 may be implemented with other gating and pooling operations as described in further detail hereinafter. It is also appreciated that, although an AFT implementing Equation (3) can mimic aspects of the extreme case of attention, the AFTs described herein do not need to approximate any MHA counterpart and can indeed have very different inductive biases than that of an attention-based transformer.

For example, an AFT-relu implementation can be provided by taking only the first half of AFT-relu2 implementation above, resulting in Equation (4):

$$f(Q, K, V) = [Q']_+ \odot \sum_{t=1}^{T} ([K']_+ \odot V')_t, \qquad (4)$$

which cuts down both time and space complexity by half, relative to the AFT-relu2 implementation of Equations (2) and (3). It should be appreciated that Equation (4) above can be provided with support for broadcasting when the operands' dimensions don't exactly match.

In one or more implementations, transformer 220 may be implemented as an AFT-relu transformer, in which the gating and pooling operation 307 is implemented using Equation (4) above. As can be seen from Equation (4), for a transformer 220 implemented as an AFT-relu transformer, performing the gating and pooling operation may include performing a first gating operation (e.g., $[K']_+ \odot V'$), performing a pooling operation $$\left(\text{e.g., } \sum_{t=1}^{T}\right)$$

using a result of the first gating operation, and performing a second gating operation $$\left(\text{e.g.,}\ [Q']_+ \odot \sum_{t=1}^{T}\right)$$

using a result of the pooling operation. In this example, the first gating operation (e.g., $[K']_+ \odot V'$) includes an element-wise product $\odot$ using a key matrix, K, and a value matrix, V, the first gating operation further includes computing a relu function $[\bullet]_+$ using the key matrix K prior to performing the element-wise product $\odot$, and the pooling operation $$\left(\text{e.g.,}\ \sum_{t=1}^{T}\right)$$

includes computing a sum over rows of the result of the element-wise product $\odot$ using the key matrix, K, and the value matrix, V. In this example, the second gating operation $$\left(\text{e.g.,}\ [Q']_+ \odot \sum_{t=1}^{T}\right)$$

includes computing an additional element-wise product $\odot$ using a query matrix, Q, and the result of the pooling operation. In an AFT implementing Equation (4) above, the key and value are first combined with an element-wise multiplication, the result of which is then pooled over the context dimension, yielding a fixed length context vector. This context vector is then multiplied with each row of the query, which forms the final output of an AFT layer.

It should also be appreciated that, in one or more implementations, one or more nonlinearities (e.g., the $[\bullet]_+$ relu operations) of Equation (4) can be replaced with a nonlinearity $\sigma_q$ applied to the query and a nonlinearity $\sigma_k$ applied to the key, which can be the same or different linearities, and/or can be the same as the $[\bullet]_+$ operation or can be a different nonlinearity operation.

In yet other implementations, the gating and pooling operation 307 of transformer 220 may be implemented using Equation (5):

$$f(Q, K, V) = [Q']_+ \odot \sum_{t=1}^{T} (\text{softmax}_c(K') \odot V')_t, \quad (5)$$

in which the relu non-linearity on K' is replaced with a softmax function, where $\text{softmax}_c$ indicates a softmax function applied to each column of a matrix.

In one or more implementations, transformer 220 may be implemented as an AFT-softmax transformer, in which the gating and pooling operation 307 is implemented as Equation (5) above. As can be seen from Equation (5), for a transformer 220 implemented as an AFT-softmax transformer, performing the gating and pooling operation may include performing a first gating operation (e.g., $\text{softmax}_c(K') \odot V'$), performing a pooling operation $$\left(\text{e.g.,}\ \sum_{t=1}^{T}\right)$$

using a result of the first gating operation, and performing a second gating operation $$\left(\text{e.g.,}\ [Q']_+ \odot \sum_{t=1}^{T}\right)$$

using a result of the pooling operation. In this example, the first gating operation (e.g., $\text{softmax}_c(K') \odot V'$) includes an element-wise product $\odot$ using a key matrix, K, and a value matrix, V, the first gating operation further includes computing a softmax function using the key matrix K prior to performing the element-wise product $\odot$, and the pooling operation $$\left(\text{e.g.,}\ \sum_{t=1}^{T}\right)$$

includes computing a sum over rows of the result of the element-wise product $\odot$ using the key matrix, K, and the value matrix, V. In this example, the second gating operation $$\left(\text{e.g.,}\ [Q']_+ \odot \sum_{t=1}^{T}\right)$$

includes computing an additional element-wise product $\odot$ using a query matrix, Q, and the result of the pooling operation.

Each of the AFT-relu2, AFT-relu, and AFT-softmax implementations of the transformer 220 described above include a gating and pooling operation 307 that includes (1) applying a non-linearity, $\sigma_k$, (e.g., relu or $\text{softmax}_c$) to the key, (2) combining the key with the value with an element-wise multiplication $\odot$, (3) reducing the spatial context with global pooling $$\left(\text{e.g.,}\ \sum_{t=1}^{T}\right),$$

(4) applying a non-linearity, $\sigma_q$, (e.g., relu operation $[\bullet]_+$) to the query, Q, and (5) combining each point of the query with the reduced context.

Transformer 220, in any of the AFT implementations described herein (e.g., an AFT-relu2 transformer, an AFT-relu transformer, or an AFT-softmax transformer) may also be modified for implementation as a causal attention-free transformer (e.g., by constraining, in Equations (3), (4), or (5), the queries from interacting with keys and values beyond a current position t). For example, an AFT-softmax transformer in which the gating and pooling operation 307 is implemented using Equation (5) above can be modified to form a causal AFT by implementing the gating and pooling operation 307 using Equation (6):

$$Y_t = [Q'_t]_+ \odot \sum_{t'=1}^{t} (softmax_c(K'_{\leq t}) \odot V'_{\leq t})_{t'}, t = 1, \ldots, T, \quad (6)$$

where $Y_t = f(Q_{\leq t}, K_{\leq t}, V_{\leq t})$, $t=1, \ldots, T$ is the output of an AFT layer (e.g., the output of the causal AFT-softmax in Equation (6)), and the subscript $X_t$ indexes the tth row of matrix X. In this way, queries can be constrained from interacting with keys and values beyond a current position tin the AFT-softmax transformer. In this example, $Y_t$ includes input information at the current position t. In another example, the current position can be excluded by shifting the outputs to the right.

It should also be appreciated that one or more nonlinearities (e.g., the $[\cdot]_+$ operation and the $softmax_c$ operation) of Equation (5) and/or Equation (6) can be replaced with a nonlinearity $\sigma_q$ applied to the query and a nonlinearity $\sigma_k$ applied to the key, which can be the same or different nonlinearities, and/or can be the same as the $[\cdot]_+$ operation and/or the softmax operation, or can be a different linearity operations. Implementations of an AFT-softmax transform using, for example, Equation (5) above may be referred to as AFT-relu-softmax transformers.

As discussed herein, the causal mode of AFT has an additional advantage of a constant decoding cost per step. For example, it can be seen that Equation (6) includes a recursion of $Y_t = \sigma_q(Q_t') \odot (\sigma_k(K_t') \odot V_t' + KV_{t-1})$ with $KV_t = \sum_{k'=1}^{k} (\sigma_k(\overline{K_{t'}'}) \odot V_{t'}')$, in implementations in which the $\sigma_q$ and $\sigma_k$ that are used are both element-wise functions. Accordingly, the computation can be performed by keeping only KVt in memory, and updating with constant cost per step.

In various implementations of the AFTs described herein, various implementations of $\sigma_q$ and $\sigma_k$ can provide various additional nonlinearity, which helps to increase a model's capacity. In one or more implementations of the AFTs described herein, $\sigma_k$=softmax, which is normalized along the context dimension. This choice brings an interesting benefit especially in the causal mode, which can be explicitly written as:

$$Y_t = \sigma_q(Q_t') \odot \left( g_t(t) \odot V_t' + \sum_{t'=1}^{t-1} g_t(t') \odot V_{t'}' \right), g_t(t') = \frac{\exp(K_{t'}')}{\sum_{t'=1}^{t} \exp(K_{t'}')}. \quad (7)$$

For example, in Equation (7), $g_t(t)$ can perform a role similar to that of an input gate in a long short-term memory (LSTM) network, and $g_t(t')$ can operate as a forget gate, which depends on the input of time t, to dynamically downweight the contribution of past time steps. When augmented with standard position embeddings, this allows the model to be able to learn the notion of recency while having access to the full context in the history. From this view, $\sigma_q$ can also be interpreted as an output gate, for which both a sigmoid and a relu nonlinearity can be used. The same space and time complexity still holds for $\sigma_k$=softmax in both in training and decoding. In one or more implementations, $\sigma_k$ and $\sigma_k$ may be respectively set to a sigmoid and a softmax nonlinearity to form an AFT-sigmoid-softmax transformer.

In one or more implementations, a naive implementation of Equation (6) above can be provided which amounts to a sequential algorithm, in which each spatial index t is iterated. However, this naive implementation can become costly as the context size T increases, potentially preventing efficient usage of parallel computation on modern GPU-like hardware.

In one or more other implementations, the causal AFT-softmax transformer may be implemented using an efficient dynamic programming solution that cuts down the number of sequential operations to O(log T). For example, an example of a causal attention-free operation 400 is graphically illustrated in FIG. 4, and an example of an efficient dynamic programming solution for the causal AFT-softmax transformer is illustrated by the pseudo code of Algorithm 1 below.

---

Algorithm 1: Pseudo code of an efficient, in-place causal AFT-softmax/AFT-softmax-local1d.

Input: Query, key and value Q', K' ,V' ∈ $R^{T \times d}$;
optionally context size s ∈ {$2^n$, n ∈ N}.
Output: Causal AFT output Y ∈ $R^{T \times d}$.
KK = exp(K') // new memory allocation
KV = exp(K') * V' // new memory allocation
// if s is not provided default to $\lceil \log_2(T) \rceil$ iterations
for j = 1, ..., min($\lceil \log_2(T) \rceil$, $\log_2$ (s)) do
| stride = $2^{j-1}$
| KV[stride:, :] = KV[stride:, :] + KV[:T-stride, :] // in-place op
| // now KV[i] = $\Sigma_{k=max(0,i-2^j+1)}^{i}(\exp(K') * V')[k]$ , ∀i
| KK[stride:, :] = KK[stride:, :] + KK[:T-stride, :] // in-place op
⌊ // now KK[i] = $\Sigma_{k=max(0,i-2^j+1)}^{i}(\exp(K'))$ [k] , ∀i
// normalize according to $softmax_c$ and multiply with query
Y = relu(Q') * KV/KK

---

The implementation of Algorithm 1 above utilizes the fact that the context aggregation part of Equation (6) is amendable to a recursive update rule, which breaks the sequential bottleneck of the naive implementation. Moreover, the solution provided in Algorithm 1 above shows that an AFT can be efficiently implemented using an in-place operation (e.g., an operations that modifies a data structure such as a tensor directly without making a copy), which results in a spatial cost of only O(Td).

In any of the AFT implementations of transformer 220 described herein (e.g., an AFT-relu2 transformer, an AFT-relu transformer, an AFT-softmax transformer, or a causal implementation of any of these), the interaction between the query and the context (e.g., the key and value) is computed after the pooling operation is applied along the spatial dimension. In some operational scenarios in which the context is long, the pooling operation can become a bottleneck and cause difficulty of learning.

In one or more implementations, a local variant of any of the AFT implementations of transformer 220 can provided, in which the context size that each query interacts with is limited. This local causal AFT can be implemented for one-dimensional (1d) input sequences with only minimum change to the full causal AFT version, as also illustrated in Algorithm 1 above (e.g., by optionally providing a context size s). This local causal AFT implementation for 1d inputs is referred to herein as an AFT-softmax-local1d transformer.

For input data 306 with layouts other than 1d inputs (e.g., two-dimensional images), a AFT-softmax-local1d transformer may not be optimal, as the AFT-softmax-local1d transformer does not utilize the 2d layouts of pixels, which is a valuable prior. In one or more implementations, a local causal AFT for 2d input data (e.g., referred to herein as an AFT-softmax-local2d transformer) can be provided. For example, a graphical representation of a local causal AFT 500 is shown in FIG. 5, and pseudo code for implementation of an AFT-softmax-local2d transformer is shown in Algorithm 2 below.

As with the AFT-softmax-local1d implementation illustrated by Algorithm 1, the local2d version illustrated by Algorithm 2, also provides a time complexity benefit and the benefit of in-place operations. All the operations involved are basic tensor manipulations supported by modern deep learning libraries.

---

Algorithm 2: Pseudo code of an efficient, in-place causal AFT-softmax-local2d.

Input: Query, key and value Q', K', V' ∈ $R^{H \times W \times d}$, context sizes $s_h$, $s_w$ ∈ $\{2^n, n \in N^+\}$
Output: Causal AFT output Y ∈ $R^{H \times W \times d}$.
KK = exp(K') // new memory allocation
KV = exp(K') * $V^t$ // new memory allocation
// first aggregate locally across rows
for j = 1, ..., $\log_2(s_w) - 1$ do
   stride = $2^{j-1}$
   KV[:, stride:, :] = KV[:, stride:, :] + KV[:, :W-stride, :] // in-place op
   // now KV[:, i] = $\Sigma_{k=max(0,i-2^j+1)}^{i}$ (exp(K') * V') [:, k], ∀i
   KK[:, stride:, :] = KK[:, stride:, :] + KK[:, :W-stride, :] // in-place op
   // now KK[:, i] = $\Sigma_{k=max(0,1-2^j+1)}^{j}$ (exp(K')) [:, k], ∀i
// then aggregate locally across columns
for j = 1, ..., $\log_2(s_h)$ do
   stride = $2^{j-1}$
   KV[stride:, :, :] = KV[stride:, :, :] + KV[:H-stride, :, :] // in-place op
   // now KV[$i_h$, $i_w$] = now $KV[i_h, i_w] =$ $$\sum_{k_k=max(0,i_k-2^j+1)}^{i_k} \sum_{k_w=max(0,i_w-\frac{s_w}{2}+1)}^{i_w} (\exp(K') * V')[k_k, k_w], \forall i_k, i_w$$

KK[stride:, :, :] = KK[stride:, :, :] + KK[:H-stride, :, :] // in-place op
   // now KK[$i_h$, $i_w$] = now $KK[i_h, i_w] =$ $$\sum_{k_k=max(0,i_k-2^j+1)}^{i_k} \sum_{k_w=max(0,i_w-\frac{s_w}{2}+1)}^{i_w} (\exp(K'))[k_k, k_w], \forall i_k, i_w$$

// incorporate contexts to the right $idx = \min\left(arange(W) + \frac{k_w}{2}, W - 1\right)$ // arange(W) = [0, 1, ..., W - 1]

KV[1:, :, :] = KV[1:, :, :] + KV[:H-1, idx, :] // in-place op
KK[1:, :, :] = KK[1:, :, :] + KK[:H-1, idx, :] // in-place op
// normalize according to $softmax_c$ and multiply with query
Y = relu(Q') * KV/KK

---

As shown in Algorithms 1 and 2 above, in various implementations of the disclosed attention-free transformer (e.g., transformer 220), the spatial aggregation can be efficiently implemented with a dynamic programming algorithm, which operates in place and has T×log T×d time complexity instead of T×T×d. The in-place operations of Algorithms 1 and 2 may be used, in one or more implementations, for training of an attention-free transformer such as transformer 220.

In one or more implementations, a local causal AFT can be implemented using Equation (8) below:

$$Y_t = \sigma_q(Q'_t) \sum_{t'=1}^{t} w_{t,t'} (\sigma_k(K'_{\leq t}) \odot V'_{\leq t})_{t'}, \ t = 1, \ldots, T, \quad (8)$$

where $w_{t,t'} \in R$ is a locality masking scalar. For example, Equation (8) above can be used to generate two AFT implementations, such as an AFT-local-hard transformer, and an AFT-local-learned transformer. For example, in an AFT-local-hard implementation, w may be constructed as a hard local mask, where (in one example) $w_{t,t'}=1$ if t−t'<s, and 0 otherwise, with s being the desired window size. For 2d inputs such as images to an AFT-local-hard implementation, w can be similarly constructed for 2d windows. In an AFT-local-learned implementation, a system may learn a position based local bias, while still assigning non-zero weights to out-of-window contexts. In one illustrative example of an AFT-local-learned implementation, $$w_{t,t'} = \frac{\exp(I(t - t' < s)u_t^T v_{t'})}{\sum_{t'=1}^{t} \exp(I(t - t' < s)u_t^T v_{t'})},$$

where I( ) is an indicator function, and u, v ∈ $R^{T \times d_u}$ are two sets of low dimensional learnable position embeddings, independently learned per layer. In this case, dense connection can be maintained between every t, t' pair, while introducing learnable biases for more recent contexts. For example, $d_u$, may be set to a small number (e.g., 64) which greatly reduces the amount of additional parameters compared to learning a full matrix. The AFT-local-learned implementation adds very little overhead to both the time and space complexity, as w is sparse and static, and the memory cost is marginalized out across batches during training. In various AFT-local-hard and AFT-local-learned implementations, $\sigma_k$ and/or $\sigma_k$ may set to a relu, a sigmoid and/or a softmax nonlinearity (as examples).

FIG. 3 also illustrates how a training system 301 may be provided for training the transformer 220. As shown, the output 310 of transformer 220 responsive to particular input data 306 may be compared with training output data (e.g., a known translation, a known next word, a ground truth image such as a high-resolution image, a three-dimensional model, or the like, or a known probability distribution corresponding to the known translation, a known next word, a ground truth image such as a high-resolution image, a three-dimensional model, or the like) using a cost function 314, to generate feedback for adjusting the parameters (e.g., weights such as weights in the weight matrices W described herein, biases, etc.) of the transformer 220. For example, the cost function 314 may be a cross entropy loss function or other suitable loss function.

Figure 6:
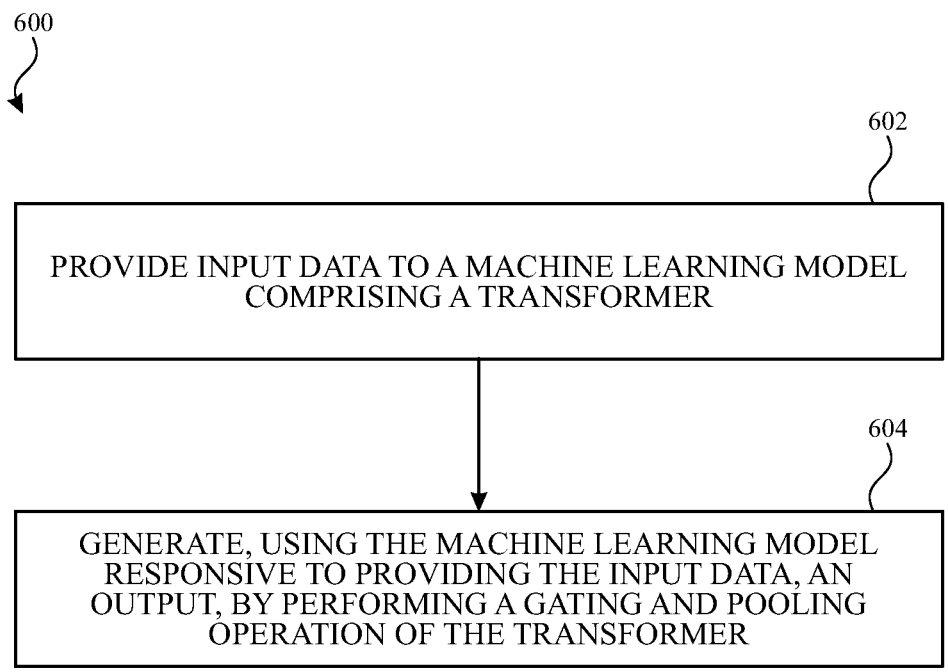
FIG. 6 illustrates an example flow diagram of a process for operating a transformer in accordance with implementations of the subject technology

FIG. 6 illustrates a flow diagram of an example process for generating an output using a transformer in accordance with one or more implementations. For explanatory purposes, the process 600 is primarily described herein with reference to the server 120 of FIG. 1. However, the process 600 is not limited to the server 120 of FIG. 1, and one or more blocks (or operations) of the process 600 may be performed by one or more other components of the server 120 and/or by other suitable devices such as electronic device 110. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

At block 602, input data such as input data 306 of FIG. 3 may be provided to a transformer. The transformer may be an attention-free transformer such as transformer 220.

At block 604, responsive to providing the input data, an output (e.g., output 310) may be generated by the transformer. Generating the output may include executing the transformer without performing an attention operation. Generating the output may include performing a gating and pooling operation of the transformer, such as one or more implementations of the gating and pooling operation 307 described herein. In one or more implementations, the output may include a different string of characters (e.g., a translation of one or more words formed by the input characters, or a predicted next word for a word formed by the input characters), a different image from the input image, such as a higher resolution image), or a three-dimensional model (e.g., an output three-dimensional model predicted based on the input image and/or three-dimensional input data). Performing the gating and pooling operation may include performing a first gating operation, performing a pooling operation using a result of the first gating operation, and performing a second gating operation using a result of the pooling operation. In one or more implementations, the transformer may be a causal attention-free transformer. In one or more implementations, the transformer may be a local causal attention-free transformer. In one or more implementations, the input data may include a string of characters or an image.

The first gating operation may include an element-wise product using a key matrix and a value matrix. The first gating operation may further include computing a relu function or a softmax function using the key matrix prior to performing the element-wise product. The pooling operation may include computing a sum over rows of the result of the element-wise product using the key matrix and the value matrix. The second gating operation may include computing an additional element-wise product using a query matrix and the result of the pooling operation. In one or more implementations, the gating and pooling operation includes applying a non-linearity to a key; combining the key with a value using an element-wise multiplication; reducing a spatial context with a global pooling operation; applying a relu operation to a query; and combining each point of the query with the reduced spatial context. In one or more implementations, the transformer may be implemented as an AFT-relu2 transformer, an AFT-relu transformer, an AFT-softmax transformer, a causal AFT, or a local causal AFT.

In one or more implementations, perform the gating and pooling operation may include performing at least one gating and pooling operation of an encoder of the transformer and at least one gating and pooling operation of a decoder of the transformer. In one or more implementations, the output of the transformer may include at least one of a translation of the input data, a prediction based on the input data, or a super-resolution image corresponding to the input data.

In one more implementations, the transformer may be trained, such as by: providing input training data to the transformer, generating a training output from the transformer, and comparing the training output to output training data. In one or more implementations, training the machine learning model may include performing an in-place computation of the gating and pooling operation (e.g., as described above in connection with Algorithm 1 and/or Algorithm 2).

Since the attention-based transformer was introduced, there have been numerous attempts (i.e., approximating the dot product, sparse local attention, context compression, gated RNNs, dynamic convolution, Synthesizer, LightConv, and Sinkhorn) to address a major source of inefficiency in the attention-based architecture, the major source being the quadratic cost of the attention operation. Improving this operation can enable larger context sizes and more efficient implementations. Some approaches focus on increased efficiency through restricting the number of keys against which the query is compared. For example, Sparse Transformers use a set of fixed context patterns derived from analysis of fully-trained attention heads. As another example, a Reformer uses approximate-nearest-neighbor search and locality-sensitive hashing to select relevant keys. As another example, attention models in vision tasks often use the structure of images to help craft relevant spatial patterns to attend. Other approaches try to learn these patterns. For example, Adaptive-Span Transformers learn a range for each attention head within which to attend. As another example, routing transformers use clustering to compute dot-product attentions only over a subset of elements within the same cluster. As another example, the Linformer Wang transformer reduces the length of the context by compressing the keys and values with a linear layer. As another example, the Sinkhorn Transformer uses a differentiable sorting operation to identify relevant comparisons that may not be local in the original sequence order. As another example, Compressive Transformers compute and update reduced representations of the input that are far enough back in the input sequence, and attend to those compressed representations. Instead of limiting the number of comparisons being done, other methods alter the attention computation. For example, a Britz Efficient Attention transformer notes that changing the order of matrix multiplications and the softmax nonlinearity can give a matrix that is quadratic on the feature dimension of the inputs rather than on the length of the context.

In contrast with the above attempts, including the Sparse Transformers, the Reformers, the attention models in vision tasks, the Adaptive-Span Transformers, the routing transformers, the Linformer Wang transformer, the Sinkhorn Transformer, the Compressive Transformers, and the Britz Efficient Attention transformer, the disclosed attention-free transformers (e.g., in various implementations of transformer 220) provide technical advantages, as the attention-free transformers disclosed herein (e.g., in various implementations of transformer 220) can operate without domain knowledge to derive sparsity patterns, or costly learned masking, and can achieve significantly greater computational and memory savings as the context size increases. The AFT transformers disclosed herein have been shown to provide better efficiency with comparable or better results than, as examples, self-attention, causal-linear, and reformer models.

As examples, the disclosed attention-free transformers in various implementations provide some or all of these technical advantages when trained to perform, as examples, image modeling (e.g., unconditional image modeling), image super resolution, language modeling, point cloud generation, or machine translation.

For example, in an image modeling implementation, the AFT-relu2, AFT-relu, AFT-softmax, AFT-local 1d, and AFT-local2d transformers described herein can be shown to provide comparable results to a less efficient attention-based transformer. For example, each of the AFT-relu2, AFT-relu, AFT-softmax, AFT-local1d, and AFT-local2d transformers can be applied to the problem of image modeling by minimizing the negative log likelihood (NLL). For example, an RGB image may be represented as a sequence of length H×W×3, with H and W being the height and width, respectively. Each sub-pixel may be represented as a 256-way discrete variable. For comparison of the AFT transformers with each other and with a conventional attention-based transformer, images from the CIFAR10 dataset or any other suitable set of images may be used.

Figure 7:
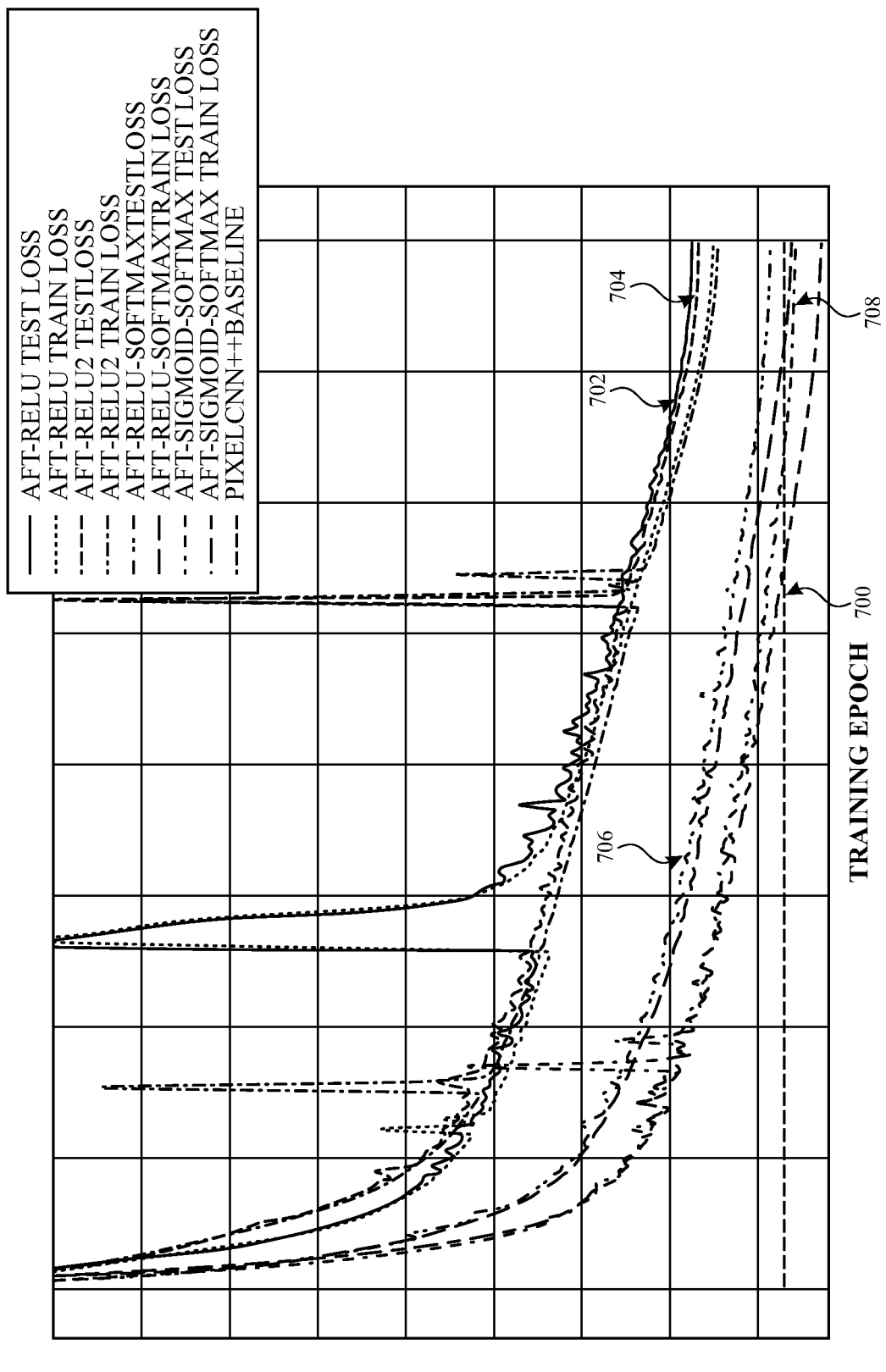
FIG. 7 illustrates example training and test losses for various transformers in accordance with one or more implementations.

FIG. 7 illustrates the results of image modeling using the AFT-relu2, AFT-relu, AFT-softmax transformers, in comparison with a baseline 700. The baseline 700 in FIG. 7 may represent the loss in bits per dimension (bits/dim) of an attention-based transformer block that consists of a MHA layer with residual connection and a two layer multilayer perceptron (MLP) with residual connection. Layer Normalization (LN) may be applied in an "pre-act" fashion, learned position embeddings may be used, a set of shared token embeddings and prediction heads across RGB may be used.

Also shown in FIG. 7 are an AFT-relu test loss 702, an AFT-relu2 test loss 704, an AFT-relu-softmax test loss 706, an AFT-sigmoid-softmax test loss 706 as a function of training epoch. As shown, the AFT-relu test loss 702, AFT-relu2 test loss 704, and AFT-softmax test loss 706, and the AFT-sigmoid-softmax test loss 706 validate the legitimacy of AFT and with four variants using the four different sets of non-linearities.

The losses illustrated in FIG. 7 may be obtained using a base architecture that consists of twenty four transformer blocks, each with 256 dimensional features. The hidden layer of the MLP in each block may have a 4× dimensionality than its input. An Adam optimizer may be used, a standard warmup learning rate schedule may be applied. An initial learning rate of $3\times10^{-3}$ and a weight decay of 0.1 may be applied to all linear transformation weights, and no dropout may be used.

The losses illustrated in FIG. 7 may be generated using a simple data augmentation strategy. For example, during training, each image may be randomly flipped horizontally, and a value in the range [−10, 10] may be added or subtracted from all the subpixels of the flipped image, while clipping the resulting pixel values to a range between [0, 255]. A cross entropy loss function (e.g., cost function 314) may be used to determine the loss, and a default batch size of 128 for 200 training epochs may be used. Various versions of AFT may be trained, such as the AFT-relu2, AFT-relu, and AFT-softmax (e.g., AFT-relu-softmax and/or AFT-sigmoid-softmax) transformers described herein, all using the full contexts.

As shown in FIG. 7, the AFT-relu2, AFT-relu, and AFT-softmax (e.g., AFT-relu-softmax and/or AFT-sigmoid-softmax) transformers are able to be trained with standard optimization techniques for transformers. As shown, the AFT-relu transformer performs slightly better than AFT-relu2 transformer in the scenarios tested, and the AFT-softmax transformers performs significantly better than either the AFT-relu or AFT-relu2 transformers in the scenarios tested.

Image modeling can also be performed using, for example, the local2d version of the AFT (e.g., using the same base architecture described above, and replacing AFT-softmax with its local version). Training and testing of the AFT-local2d transformer can include reshaping each image of size (H; W; 3) to a 2d matrix with H rows and 3 W columns, and applying a designated local context size shared across all AFT blocks. Searching over context sizes in the range {(4; 4); (4; 8); (8; 8); (8; 16); (16; 16); (16; 32)} shows that the AFT-local2d is able to be trained and provides results similar to the baseline.

With respect to image super-resolution, super-resolution is the process of recovering a high resolution image from a low resolution image while generating realistic and plausible details in the high resolution image. The AFT transformers can be trained on images from the CelebA dataset or another image dataset, and the resulting high resolution images compared with baseline high resolution images generated using, for example, a PixelRecursive or a standard attention-based image transformer. For example, the AFT transformers disclosed herein can be provided with 8×8 input images and used to generate, using the gating and pooling operations described herein, four-fold higher resolution, 32×32, images. The comparison of the higher resolution 32×32 images from the AFT transformers (e.g., in terms of negative log likelihood (NLL)) shows that the AFT transformers is able to be trained and provide results similar to the baseline(s). With respect to the image super resolution results on CelebA images, the AFT transformers described herein outperform the PixelRecursive baseline in bits/dim, and show clear advantages in speed and memory saving (e.g., which enables larger batch size) over attention-based image transformers, with no loss in model quality.

The AFT transformers described herein can also be applied to the task of point cloud generation (e.g., modeling point clouds randomly sampled from objects in a dataset, such as the ShapeNetCore v2 dataset). For example, points may be sorted into a sequence in the order of z, y and x, then uniformly 8-bit quantized based on their positions, and the AFT transformers disclosed herein can be applied to the sequence to generate self-consistent objects with fine details over The AFT transformers described herein can also be applied to the task of language modeling. Testing for language modeling applications can be performed on the WikiText-103 dataset, the Enwik8 dataset, or any other suitable training dataset. For example, the WikiText-103 dataset consists of 103M word tokens extracted from Wikipedia articles. Given a word sequence, the language modeling task for the transformer is to predict the next word. Standard transformer-based neural language models use multiple transformer layers, each with causal attention. For comparison, language modeling may be performed using an AFT-local-learned transformer, as described herein, with a window size of 32 and $d_u=256$.

Performing the language modeling using the AFT transformers described herein shows that AFT transformers are viable replacements for standard attention-based transformer modules in these architectures. While, in some scenarios, replacing transformer modules with the same number of AFT modules can reduce model capacity, this lost capacity can be made up for by making the models deeper.

In comparison with two baseline architectures including a "vanilla" architecture with 6 transformer layers, and a transformer-based architecture that uses adaptive input representations, the AFT transformers described herein can provide comparable or better language modeling results.

With respect to machine translation, for comparisons with a machine translation benchmark, comparisons of translations by the AFT transformers as disclosed herein with translations using an attention-based transformer architecture using the OpenNMT implementation (e.g., for the Workshop on Statistical Machine Translation (WMT) 2014 English to German translation task) can be performed. Using the WMT 2014 English to German translation task training dataset, which contains approximately 4.5 million sentence pairs, for a baseline comparison, the AFT transformers can be compared against a transformer architecture using the OpenNMT implementation.

This baseline uses a standard architecture with an encoder-decoder structure, where the encoder uses a non-causal attention to encode the input sentence. The baseline decoder for comparison uses two different types of attention. The first, self-attention, sequentially attends to the output translation as it is being generated token by token. The second attends to the translation and the context from the encoder. In order to implement an AFT transformer for machine translation, multi-headed decoder self-attention blocks may be replaced with AFT blocks, in one or more implementations.

A comparison of the perplexity on the training set and validation set using the baseline and the AFT transformers shows that the AFT transformers described herein can provide comparable or better machine translation results in comparison with this OpenNMT baseline. The AFT transformers described herein achieve linear complexity along both context and feature dimensions. The reduced time and space complexity, at training time, and at decoding time, of the AFT transformers disclosed herein are shown in comparison with other, attention-based, transformers in Table 1 below.

TABLE 1

| Model | Time @ train | Space @ train | Time/step @ decode | Space/step @ decode |
|---|---|---|---|---|
| Full Attention | $O(T^2d)$ | $O(T^2 + Td)$ | $O(Td)$ | $O(Td)$ |
| Reformer | $O(T\log Td)$ | $O(T\log T + Td)$ | $O(\log T + d)$ | $O(Td)$ |
| Synthesizer | $O(T^2d)$ | $O(T^2 + Td)$ | $O(Td)$ | $O(Td)$ |
| Linear Transformer | $O(Td^2)$ | $O(Td + d^2)$ | $O(d^2)$ | $O(d^2)$ |
| AFT (ours) | $O(Td)$ | $O(Td)$ | $O(d)$ | $O(d)$ |

The various implementations of attention-free transformers disclosed herein provide improved efficiency compared to a standard attention-based transformer, with demonstrated strong results on challenging benchmarks. The various implementations of attention-free transformers disclosed herein can be implemented in various tasks associated with the sequence and set modeling problems.

The various implementations of attention-free transformers disclosed herein remove or reduce the quadratic space and time complexity of attention-based transformers with respect to the context size. The various implementations of attention-free transformers disclosed herein provide improvements computational simplicity compared with multi-head attention, by replacing the complexity of multi-head attention operations with a composition of element-wise multiplications/divisions and global/local pooling. As described herein, the various implementations of attention-free transformers disclosed herein are able to be trained on challenging benchmarks, and also to match or surpass the standard attention-based transformer performance.

The various implementations of attention-free transformers disclosed herein provide a drastically different approach to transformer computations in comparison with attention-based transformers. Compared to single head attention, the use of multi heads allows each layer to learn to attend to different patterns, which enriches the representation learning capacity without increasing the computation or parameter cost. However, with a fixed parameter and output dimension, the memory cost scales in the order of O(T×T×h) with T and h being the context size and number of heads, respectively. In the extreme multi-head case, as many heads as the output dimension can be used, and each dot product attention is reduced to a scalar product attention. However, a naive implementation of extreme multi-head attention is prohibitive, as it is no longer possible to maintain a large model size due to the increased memory footprint. The various implementations of attention-free transformers disclosed herein can mimic the performance of extreme multi-head attention operations without these drawback of computing attentions.

Figure 8:
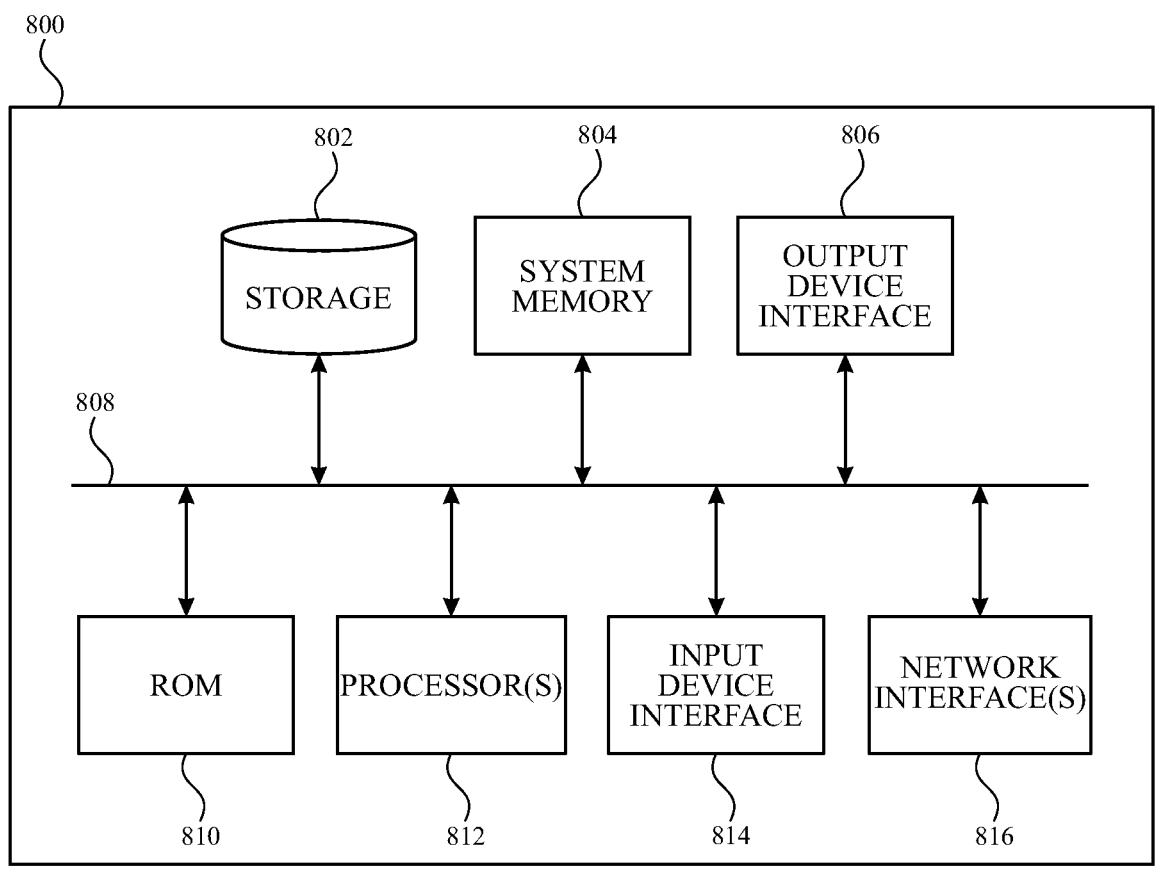
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, the electronic device 110, and/or the server 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 110 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

In accordance with aspects of the disclosure, a method is provided that includes providing input data to a transformer; and generating, using the transformer responsive to providing the input data, an output. Generating the output includes performing a gating and pooling operation of the transformer In accordance with other aspects of the disclosure, a system is provided that includes a processor; and a memory device containing instructions, which when executed by the processor, cause the processor to: provide input data to a transformer; and generate, using the transformer responsive to providing the input data, an output. Generating the output includes performing a gating and pooling operation of the transformer.

In accordance with other aspects of the disclosure, a non-transitory machine-readable medium is provided that includes code that, when executed by a processor, causes the processor to perform a method, the method including providing input data to a transformer; and generating, using the transformer responsive to providing the input data, an output. Generating the output includes performing a gating and pooling operation of the transformer.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
processing an input data using a transformer, wherein the input data comprises a string of text;

generating, using the transformer responsive to processing the input data, an output comprising a translation of the input data, wherein generating the output comprises:
  processing the input data to generate a key, a value, and a query, wherein the key, the value and the query are embedding matrices generated using linear transformations of the input data;
  performing a gating and pooling operation of the transformer, wherein the gating and the pooling operation comprises:
    applying a non-linearity to the key;
    combining the key with the value using an element-wise multiplication;
    reducing a spatial context by performing a global pooling operation on the combined key and value;
    applying a non-linearity to the query; and
    combining the query with the reduced spatial context.

2. The method of claim 1, wherein the transformer is an attention-free transformer, and wherein generating the output comprises executing the transformer without performing an attention operation.

3. The method of claim 1, wherein performing the gating and pooling operation comprises performing a first gating operation, performing a pooling operation using a result of the first gating operation, and performing a second gating operation using a result of the pooling operation.

4. The method of claim 3, wherein first gating operation comprises an element-wise product using a key matrix and a value matrix.

5. The method of claim 4, wherein the first gating operation further comprises computing a softmax function using the key matrix prior to performing the element-wise product.

6. The method of claim 4, wherein the pooling operation comprises computing a sum over rows of the result of the element-wise product using the key matrix and the value matrix.

7. The method of claim 6, wherein the second gating operation comprises computing an additional element-wise product using a query matrix and the result of the pooling operation.

8. The method of claim 1, wherein the transformer is a causal attention-free transformer.

9. The method of claim 1, wherein the transformer is a local causal attention-free transformer.

10. The method of claim 9, wherein the local causal attention-free transformer is an AFT-local-hard transformer.

11. The method of claim 9, wherein the local causal attention-free transformer is an AFT-local-learned transformer.

12. The method of claim 1, further comprising training the transformer by providing input training data to the transformer, generating a training output from the transformer, and comparing the training output to output training data.

13. The method of claim 12, wherein training the transformer comprises performing an in-place computation of the gating and pooling operation.

14. The method of claim 1, wherein the input data comprises a string of characters or an image.

15. The method of claim 14, wherein the output comprises a different string of characters, a different image, or a three-dimensional model.

16. The method of claim 1, wherein applying the non-linearity comprises applying a relu operation.

17. The method of claim 1, wherein the gating and pooling operation comprises:
  applying a non-linearity to a key;
  combining the key with a value using an element-wise multiplication;
  reducing a spatial context with a global pooling operation;
  applying a sigmoid operation to a query; and
  combining each point of the query with the reduced spatial context.

18. A system comprising:
  a processor; and
  a memory device containing instructions, which when executed by the processor, cause the processor to:
  process an input data using a transformer, wherein the input data comprises a string of text;
  generate, using the transformer responsive to processing the input data, an output comprising a translation of the input data, wherein generating the output comprises:
    process the input data to generate a key, a value, and a query, wherein the key, the value and the query are embedding matrices generated using linear transformations of the input data;
    perform a gating and pooling operation of the transformer, wherein the gating and the pooling operation comprises:
      applying a non-linearity to the key;
      combining the key with the value using an element-wise multiplication;
      reducing a spatial context by performing a global pooling operation on the combined key and value;
      applying a non-linearity to the query; and
      combining the query with the reduced spatial context.

19. The system of claim 18, wherein the instructions, when executed by the processor, cause the processor to perform the gating and pooling operation by performing at least one gating and pooling operation of an encoder of the transformer and at least one gating and pooling operation of a decoder of the transformer.

20. The system of claim 18, wherein the input data comprises at least one of a two-dimensional input data such as an image or an array of values, three-dimensional input data such as a three-dimensional model or point cloud, or other input data arranged in one, two, three, or more than three dimensions and the output of the transformer comprises at least one of a prediction based on the input data, or a super-resolution image corresponding to the input data.

21. The system of claim 18, wherein applying the non-linearity comprises applying a relu operation.

22. A non-transitory machine-readable medium comprising code that, when executed by a processor, causes the processor to perform a method, comprising:
  processing an input data using a transformer, wherein the input data comprises a string of text;
  generating, using the transformer responsive to processing the input data, an output comprising a translation of the input data, wherein generating the output comprises:
    processing the input data to generate a key, a value, and a query, wherein the key, the value and the query are embedding matrices generated using linear transformations of the input data;
    performing a gating and pooling operation of the transformer, wherein the gating and the pooling operation comprises:

applying a non-linearity to the key;
combining the key with the value using an element-wise multiplication;
reducing a spatial context by performing a global pooling operation on the combined key and value;
applying a non-linearity to the query; and
combining the query with the reduced spatial context.

23. The non-transitory machine-readable medium of claim 22, wherein:
the transformer is an attention-free transformer;
generating the output comprises executing the transformer without performing an attention operation; and
performing the gating and pooling operation comprises:
performing a first gating operation,
performing a pooling operation using a result of the first gating operation, and
performing a second gating operation using a result of the pooling operation.

\* \* \* \* \*

UNITED STATES PATENT AND TRADEMARK OFFICE
CERTIFICATE OF CORRECTION

PATENT NO.         : 12,271,791 B2
APPLICATION NO.    : 17/308033
DATED              : April 8, 2025
INVENTOR(S)        : Shuangfei Zhai et al.

Page 1 of 1

It is certified that error appears in the above-identified patent and that said Letters Patent is hereby corrected as shown below:

On the Title Page

In item (56) Other Publications:
Column 2, Line 13: Replace "Ba, ct al., "Laycr normalization," 2016, rctricvcd from arXiv.org/" with
--Ba, et al., "Layer normalization," 2016, retrieved from arXiv.org/--.

Signed and Sealed this
First Day of July, 2025

Coke Morgan Stewart
*Acting Director of the United States Patent and Trademark Office*